(12) United States Patent
Katagiri et al.

(10) Patent No.: US 10,596,707 B2
(45) Date of Patent: Mar. 24, 2020

(54) ARTICLE TRANSFER DEVICE

(71) Applicant: Fanuc Corporation, Yamanashi (JP)

(72) Inventors: Taiki Katagiri, Yamanashi (JP);
Masafumi Ooba, Yamanashi (JP);
Kentaro Koga, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 6 days.

(21) Appl. No.: 16/015,444

(22) Filed: Jun. 22, 2018

(65) Prior Publication Data

US 2019/0039247 A1 Feb. 7, 2019

(30) Foreign Application Priority Data

Aug. 3, 2017 (JP) ................................. 2017-150629

(51) Int. Cl.
*B25J 9/16* (2006.01)
*G05B 19/418* (2006.01)
(Continued)

(52) U.S. Cl.
CPC ........... *B25J 9/1697* (2013.01); *B25J 9/0093* (2013.01); *G05B 19/402* (2013.01);
(Continued)

(58) Field of Classification Search
CPC ...... B25J 9/1697; B25J 9/0093; B25J 19/023; G05B 19/402; G05B 19/406;
(Continued)

(56) References Cited

U.S. PATENT DOCUMENTS

| 5,040,056 A | 8/1991 | Sager et al. |
| 2011/0074171 A1 | 3/2011 | Maehara et al. |

(Continued)

FOREIGN PATENT DOCUMENTS

| CN | 105437248 A | 3/2016 |
| CN | 105775624 A | 7/2016 |

(Continued)

OTHER PUBLICATIONS

Japan Patent Office, Decision to Grant a Patent and Memorandum thereof, dated May 28, 2019.
(Continued)

*Primary Examiner* — Spencer D Patton
(74) *Attorney, Agent, or Firm* — Winstead PC (57) ABSTRACT

An article transfer device includes a robot configured to perform a workpiece picking operation; an image capturing device that captures an image of a workpiece on a conveyor; and a control unit, configured to execute, a workpiece identification process performing workpiece detection in the captured images; a workpiece information storage process storing workpiece information about a position and an angle of each detected workpiece in a storage device; and an identical workpiece determination process comparing the workpiece information of each of the detected workpieces in a newly captured image with the workpiece information of each of the detected workpieces in previously captured images, to determine whether the detected workpieces that are identical to the detected workpieces in the previously captured images exist in the newly captured image, to store in the storage device only the workpiece information of one of the images regarding the detected workpieces determined to be identical.

5 Claims, 7 Drawing Sheets

(51) Int. Cl.
    *G05B 19/402* (2006.01)
    *B25J 9/00* (2006.01)
(52) U.S. Cl.
    CPC .............. *G05B 19/4182* (2013.01); *G05B 2219/39102* (2013.01); *G05B 2219/39106* (2013.01); *G05B 2219/40038* (2013.01); *G05B 2219/40554* (2013.01)
(58) Field of Classification Search
    CPC ............ G05B 19/4061; G05B 19/4182; G05B 2219/40038; G05B 2219/49145; G05B 2219/49148; G05B 2219/49157; G05B 2219/35306; G05B 2219/39102; G05B 2219/39104; G05B 2219/39106; G05B 2219/40554; G05B 2219/45063
    See application file for complete search history.

(56) References Cited

U.S. PATENT DOCUMENTS

| | | |
|---|---|---|
| 2011/0082586 A1 | 4/2011 | Nishihara |
| 2012/0229620 A1 | 9/2012 | Ikeda et al. |
| 2014/0288711 A1 | 9/2014 | Sawada et al. |
| 2016/0075025 A1 | 3/2016 | Maeda |
| 2016/0083198 A1 | 3/2016 | Nishizaka et al. |
| 2016/0234429 A1 | 8/2016 | Cho |
| 2018/0056523 A1 | 3/2018 | Aiso et al. |

FOREIGN PATENT DOCUMENTS

| | | |
|---|---|---|
| EP | 2497611 A2 | 9/2012 |
| EP | 2783813 A2 | 10/2014 |
| EP | 2998077 A2 | 3/2016 |
| EP | 3020517 A2 | 5/2016 |
| EP | 3290165 A2 | 3/2018 |
| JP | 2001188604 | 7/2001 |
| JP | 2002274641 | 9/2002 |
| JP | 200733328 | 2/2007 |
| JP | 2009291895 | 12/2009 |
| JP | 2010-052114 A | 3/2010 |
| JP | 2010122777 | 6/2010 |
| JP | 2010264559 | 11/2010 |
| JP | 2011-073066 A | 4/2011 |
| JP | 2012-055995 A | 3/2012 |
| JP | 2012187651 | 10/2012 |
| JP | 2014-161965 A | 9/2014 |
| JP | 2014180724 | 9/2014 |
| JP | 2016059980 | 4/2016 |
| JP | 2016146143 | 8/2016 |
| JP | 2016-185573 A | 10/2016 |
| JP | 2018034242 | 3/2018 |

OTHER PUBLICATIONS

Search report submitted by an external searching organization to Japan Patent Office in JP App. No. 2017-150629, dated May 29, 2019.

ARTICLE TRANSFER DEVICE

CROSS-REFERENCE TO RELATED APPLICATIONS

This application is based on and claims priority to Japanese Patent Application No. 2017-150629 filed on Aug. 3, 2017, the content of which is incorporated herein by reference in its entirety.

TECHNICAL FIELD

The present invention relates to an article transfer device.

BACKGROUND ART

Conventionally, there is known an article transfer device which is configured to capture, by an image capturing device, an image of a plurality of workpieces which are randomly placed on a conveyor and which are moved by operation of the conveyor, and to perform a workpiece picking by a robot by using the image captured by the image capturing device (for example, see PTL 1). The article transfer device is configured to detect a workpiece in a captured image, to set a proximity state determination region around each detected workpiece, and to determine whether there is another detected workpiece in the proximity state determination region.

CITATION LIST

Patent Literature

{PTL 1}
Japanese Unexamined Patent Application, Publication No. 2016-185573

SUMMARY OF INVENTION

An article transfer device according to an aspect of the present disclosure includes at least one robot configured to perform a workpiece picking operation with respect to a conveyor for transferring a plurality of workpieces; an image capturing device configured to sequentially capture images of the workpieces on the conveyor; and a control unit, wherein the control unit is configured to execute: a workpiece identification process which performs workpiece detection in the images captured by the image capturing device; a workpiece information storage process which stores workpiece information about a position and an angle of each detected workpiece in a storage device, when the workpiece detection is performed in the workpiece identification process; an identical workpiece determination process which compares the workpiece information of each of the detected workpieces in a newly captured image, to which the workpiece detection is performed, with the workpiece information of each of the detected workpieces in at least one of previously captured images, to which the workpiece detection is performed, to determine whether one or more of the detected workpieces that are identical to the detected workpieces in the at least one previously captured images exist in the newly captured image; a workpiece information selection process which performs selection with respect to at least one detected workpiece determined as an identical one in the identical workpiece determination process, in order to store in the workpiece information storage device only one of the workpiece information regarding the newly captured image and the workpiece information regarding the at least one of the previously captured images, the workpiece information to be stored being closer to predetermined reference information; an interference area setting process which sets an interference area for each of the detected workpieces in each of the images; and an interference determination process which determines whether or not the interference area of the each detected workpiece interferes with a contour of another detected workpiece, wherein the robot does not perform the workpiece picking operation for detected workpieces to which interference is determined by the interference determination process.

DESCRIPTION OF EMBODIMENTS

Hereinafter, an article transfer device according to a first embodiment of the present invention will be described with reference to the drawings.

Figure 1:
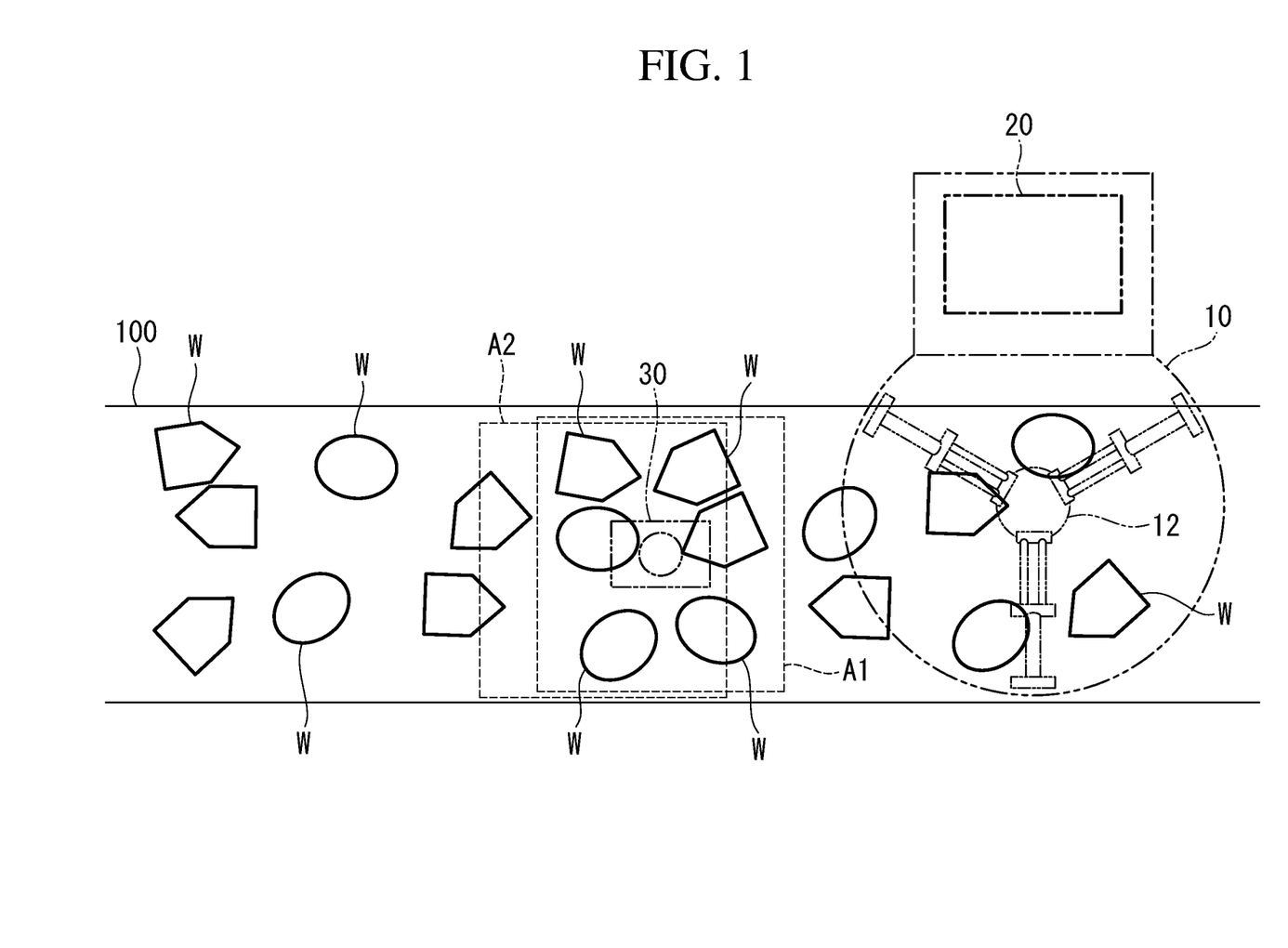
FIG. 1 is a schematic plan view of an article transfer device according to a first embodiment of the present invention.

As shown in FIG. 1, the article transfer device includes a robot 10 for performing a picking operation of a workpiece W from a conveyor 100, a control device 20, and an image capturing device 30, arranged above the conveyor 100, for sequentially capturing images of the workpiece W on the conveyor 100. As the conveyor 100, various known conveyors such as a conveyor belt, an apron conveyor, a pan conveyor, a vibratory conveyor, and a roller conveyor may be used. Additionally, the image capturing device 30 is configured to perform image-capturing every time the conveyor 100 moves a predetermined distance.

The robot 10 includes a plurality of arm members and joints, and also includes a plurality of servo motors 11 for driving respective joints. As each servo motor 11, various servo motors such as a rotary motor and a linear motor may be used. Each servo motor 11 includes an operation position detection device, such as an encoder, for detecting an operation position of the servo motor 11, and a detection value of the operation position detection device is transmitted to the control device 20.

A workpiece holding device 12 capable of holding a workpiece W is attached to a distal end of the robot 10. The workpiece holding device 12 may include claws for grasping the workpiece W or may include an electromagnet or a suction device to which the workpiece W is attracted. The workpiece holding device 12 is controlled by the control device 20.

Figure 2:
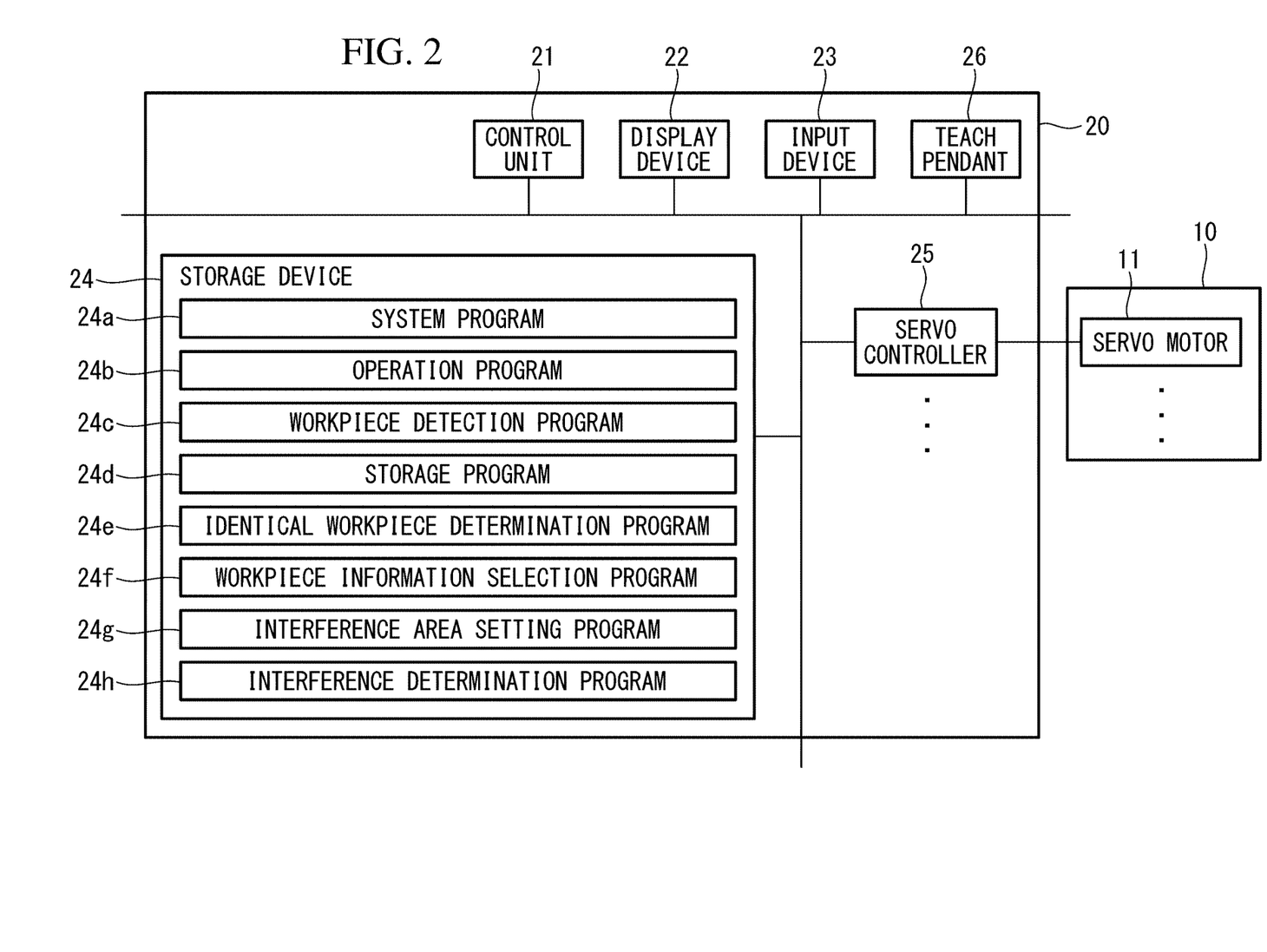
FIG. 2 is a block diagram of the article transfer device according to the first embodiment.

As shown in FIG. 2, the control device 20 includes a control unit 21 including a CPU, RAM and the like, a display device 22, an input device 23, a storage device 24 including a non-volatile storage, ROM or the like, a plurality of servo controllers 25 provided correspondingly to the respective servo motors 11 of the robot 10, and a teach pendant 26 which is connected to the control device 20 and which can be carried by an operator, for example. The teach pendant 26 is used mainly to teach the robot 10 and may be configured to wirelessly communicate with the control device 20.

A system program 24a is stored in the storage device 24, and the system program 24a provides a basic function of the control device 20. Furthermore, at least one operation program 24b created by using the teach pendant 26 is stored in the storage device 24.

Furthermore, the storage device 24 stores a workpiece detection program (workpiece identification means) 24c for performing workpiece detection in a captured image, a storage program 24d for saving in the storage device (workpiece information storage device) 24, for each detected workpiece W, workpiece information about position and angle of the detected workpiece W, an identical workpiece determination program (identical workpiece determination means) 24e for determining whether an identical detected workpiece W as that in a previous image is present in a new image or not, and a workpiece information selection program (workpiece information selection means) 24f for achieving a state where only one of the workpiece information for the new image and the workpiece information for the previous image is saved with respect to the detected workpieces W which are determined to be the identical workpiece W.

Furthermore, the storage device 24 stores an interference area setting program (interference area setting means) 24g for setting an interference area IA for each detected workpiece W in each image, and an interference determination program (interference determination means) 24h for determining whether the interference area IA of each detected workpiece W interferes with a contour of another detected workpiece W or not.

The control unit 21 operates according to the system program 24a and reads out the operation program 24b stored in the storage device 24 and temporarily stores the operation program 24b in the RAM, transmits a control signal to each servo controller 25 according to the operation program 24b that is read out, and thereby controls a servo amplifier of each servo motor 11 of the robot 10, and controls grasping/non-grasping of a workpiece W by the workpiece holding device 12.

The control unit 21 performs the following process to perform grasping of a workpiece W by the workpiece holding device 12.

First, the control unit 21 operates according to the workpiece detection program 24c, performs known image processing, such as binarization processing, on image data (hereinafter also referred to simply as "image") received from the image capturing device 30, and emphasizes the contour or the like of each workpiece W in the image. Then, a shape of the contour is compared with a model image stored in advance in the storage device 24, and one corresponding to a contour which is matched to a degree exceeding a predetermined reference is detected as the workpiece W.

Next, the control unit 21 operates according to the storage program 24d, and saves in the storage device 24, for each detected workpiece W, workpiece information including the position and angle of the detected workpiece W. The position may be a position of a center or a feature point of the contour of the detected workpiece W with respect to a reference position of the robot 10 or a reference position of the conveyor 100, for example. The angle may be an angle formed by a center line of the contour of the detected workpiece W to a movement direction of the conveyor 100, for example.

Workpiece detection and storing of workpiece information described above are performed every time the control unit 21 receives an image from the image capturing device 30.

Figure 3:
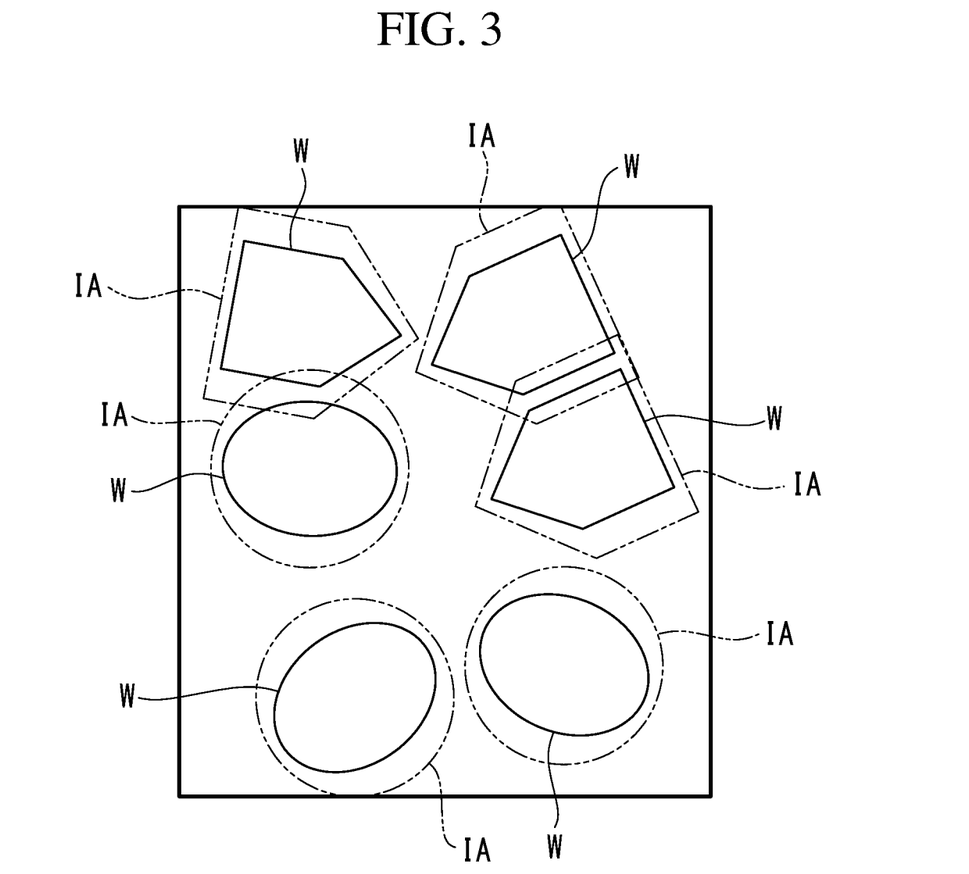
FIG. 3 is a diagram showing an example image captured by an image capturing device of the article transfer device according to the first embodiment.
Figure 4:
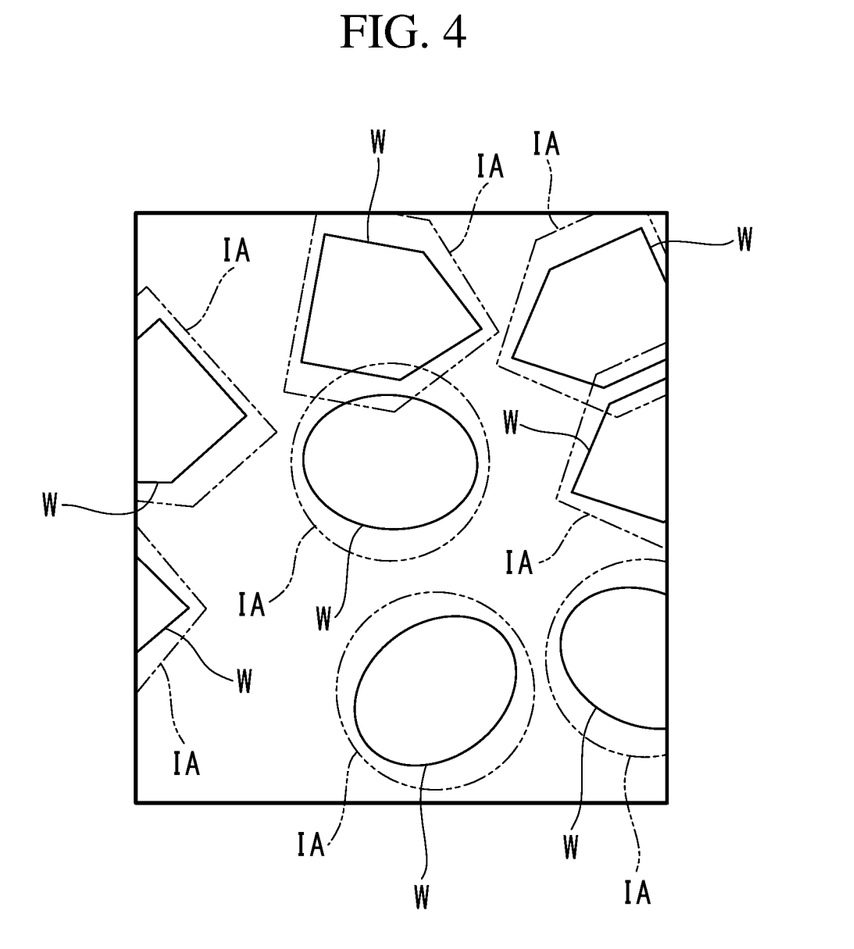
FIG. 4 is a diagram showing an example image captured by the image capturing device of the article transfer device according to the first embodiment.

Next, the control unit 21 operates according to the identical workpiece determination program 24e and determines whether an identical detected workpiece W as that in a previous image is present in a new image or not. For example, after capturing an image of a range A1 in FIG. 1, the image capturing device 30 captures an image of a range A2 in FIG. 1. The image of the range A1 is as shown in FIG. 3, and the image of the range A2 is as shown in FIG. 4. Additionally, in FIG. 1, the range A1 and the range A2 are shown shifted in a width direction of the conveyor 100, but the range A1 and the range A2 are actually not shifted in the width direction of the conveyor 100.

That is, when the control unit 21 receives the image of the range A2, the image in FIG. 4 becomes the new image, and the image in FIG. 3 becomes the previous image. The number of the previous images may be more than one, instead of one.

The workpiece information including information about the position and angle is obtained for each detected workpiece W by the control unit 21 according to the workpiece detection program 24c and the storage program 24d, and by comparing the workpiece information with each other, whether or not the identical detected workpiece W as that in the previous image is present in the new image is determined. For example, in the case where workpiece information, the difference of which to the workpiece information of the detected workpiece W in the new image is within a predetermined reference value, is present in the previous image, this detected workpiece W is determined to be present also in the previous image.

When the identical detected workpiece W is determined to be present in the new image and the previous image, the control unit 21 operates according to the workpiece information selection program 24f, and compares the workpiece information for the new image and the workpiece information for the previous image against a model image stored in advance in the storage device 24 or information obtained from the model image, and saves the workpiece information having a highest similarity to the model image in the storage device 24 as the workpiece information of the detected workpiece W.

For example, in the case where the shape of the contour of the detected workpiece W detected by the workpiece detection program 24c is included in the workpiece information, the shape of the contour is compared with the model image, and workpiece information with a highest degree of match (i.e., the closest workpiece information) is saved in the storage device 24 as the workpiece information of the detected workpiece W. Furthermore, in the case where a length of the center line or a length of each side of the contour of the detected workpiece W is included in the workpiece information, such a length is compared with the length of the center line or the length of each side used as the model, and workpiece information with a highest degree of match (i.e., the closest workpiece information) is saved in the storage device 24 as the workpiece information of the detected workpiece W. In either case, only one of the workpiece information for the new image and the workpiece information for the previous image, which is closer to predetermined reference information, is stored in the storage device 24.

Subsequently, the control unit 21 operates according to the interference area setting program 24g and sets an interference area IA for each detected workpiece W in each image, as shown in FIGS. 3 and 4, for example. A shape of the interference area IA is stored in advance in the storage device 24 in accordance with the type of the workpiece W, and the shape of the interference area IA to be applied is automatically selected based on the shape of the contour of each detected workpiece W, for example. The stored shape of the interference area IA is rotated based on the information about the angle included in the workpiece information of each detected workpiece W, and is arranged based on the information about the position included in the workpiece information of each detected workpiece W, and the interference area IA is thereby set for each detected workpiece W in each image.

Subsequently, the control unit 21 operates according to the interference determination program 24h, and determines whether or not the interference area IA of each detected workpiece W interferes with the contour of another detected workpiece W. In the case shown in FIG. 3, two pentagonal detected workpieces W on the upper right are determined to be interfering with each other, and a pentagonal detected workpiece W and an oval detected workpiece W on the upper left are determined to be interfering with each other.

Then, the control unit 21 controls the servo amplifier of each servo motor 11 of the robot 10 by using the workpiece information of each detected workpiece W, transferring speed of the conveyor 100 and the like, controls grasping/non-grasping of the workpiece W by the workpiece holding device 12, and picks up the workpieces W on the conveyor 100 one by one. At this time, the control unit 21 controls each servo motor 11 and the workpiece holding device 12 in order not to perform the workpiece picking operation for detected workpieces W which are determined to be interfering with each other.

As described above, according to the present embodiment, with respect to a detected workpiece W which is present in a new image and at least one previous image, the workpiece information of the new image and the workpiece information of the previous image are compared with each other, and the workpiece information which is more similar to the model image for the workpiece W is saved in the storage device 24. In the case where the shape of the workpiece W itself is not greatly varied, it can be said that the more similar to the model image, the closer the shape of the detected workpiece W to the actual shape. Accordingly, the workpiece information of the detected workpiece W which is closer to the actual shape is saved in the storage device 24.

Because the robot 10 performs the picking operation by using the position, angle or the like of the detected workpiece W obtained from the workpiece information, if the workpiece information of the detected workpiece W which is closer to the actual shape is kept in the storage device 24, position recognition and angle recognition can be more accurately performed for the workpiece W.

Furthermore, because the interference area IA is set for such a more accurate detected workpiece W, the interference area IA is more appropriately set, and this is advantageous in increasing the accuracy and efficiency of the picking operation of the workpiece W.

Moreover, according to the present embodiment, the interference area IA is set according to the type of the workpiece W, and thus, a more appropriate range is set as the interference area IA according to the type of the workpiece W, and this is even more advantageous in increasing the accuracy and efficiency of the picking operation of the workpiece W.

Moreover, according to the present embodiment, the image capturing device 30 captures an image of the workpiece W every time the conveyor 100 moves a predetermined distance. According to such a configuration, an overlapping range of a new image and a previous image may be easily and reliably set. For example, in the case where a range where the planar shape of the workpiece W is accurately captured by the image capturing device 30 is known, a state where all the workpieces W are inevitably entirely captured in the range where the planar shapes of the workpieces are accurately captured may be realized by setting the predetermined distance.

Additionally, the image capturing device 30 may perform image-capturing every predetermined period of time or may perform image-capturing at other set timings, and in either case, sequential image-capturing is performed.

Furthermore, shape data or image data of the contour of the detected workpiece W may be saved in the storage device 24 as the workpiece information, instead of the position and angle of the detected workpiece W. Because the position and angle of the detected workpiece W may be specified or derived from the shape data or the image data of the contour, such workpiece information is also information about the angle and position of the detected workpiece W.

An article transfer device according to a second embodiment of the present invention will be described below with reference to the drawings.

In addition to the configuration of the first embodiment, the second embodiment includes a configuration for arbitrarily setting the interference area IA. The same structural elements as those in the first embodiment will be denoted by the same reference signs, and description thereof will be omitted.

Figure 5:
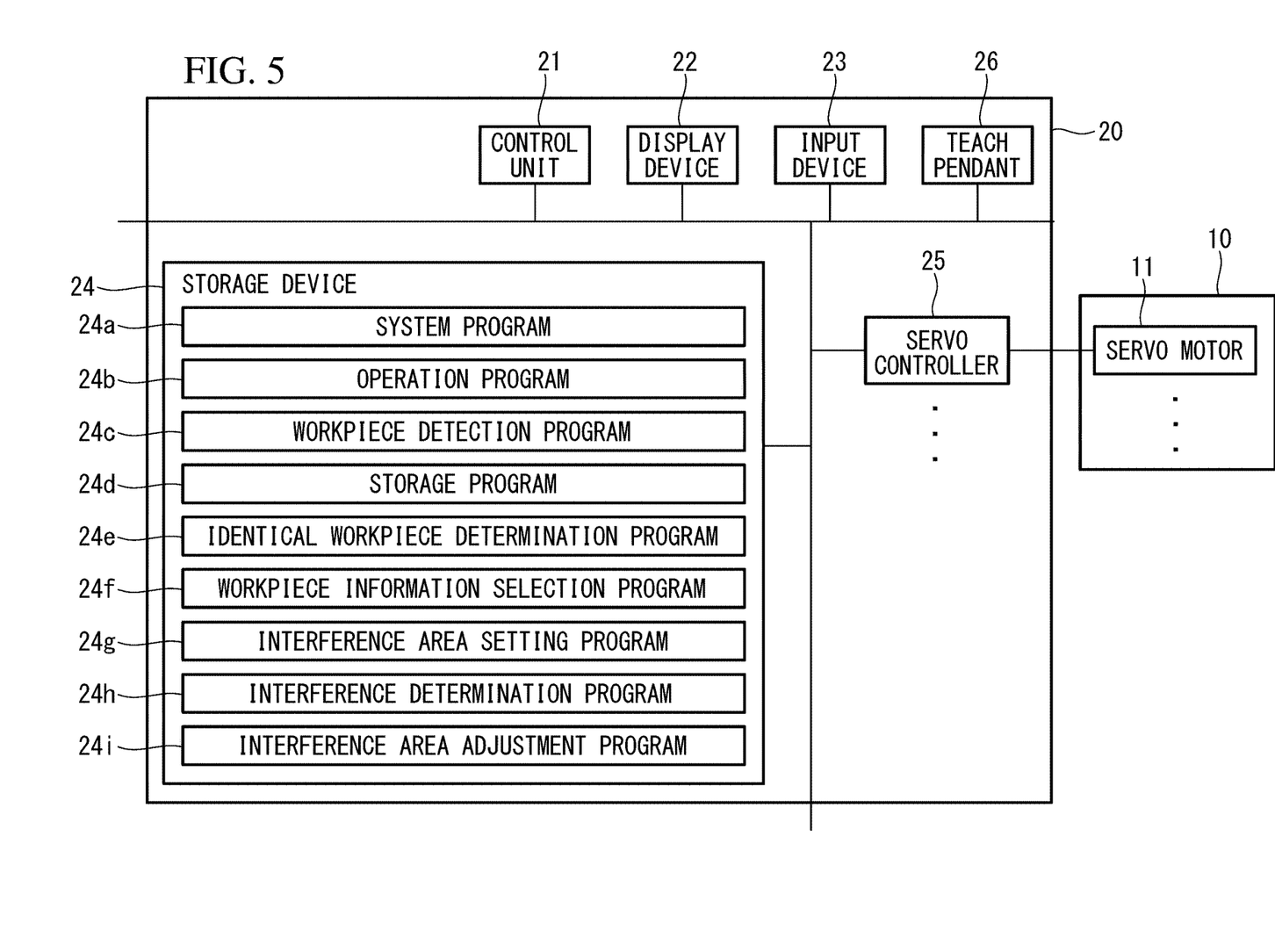
FIG. 5 is a block diagram of an article transfer device according to a second embodiment of the present invention.

As shown in FIG. 5, in the second embodiment, an interference area adjustment program (interference area adjustment means) 24i is stored in the storage device 24.

Figure 6:
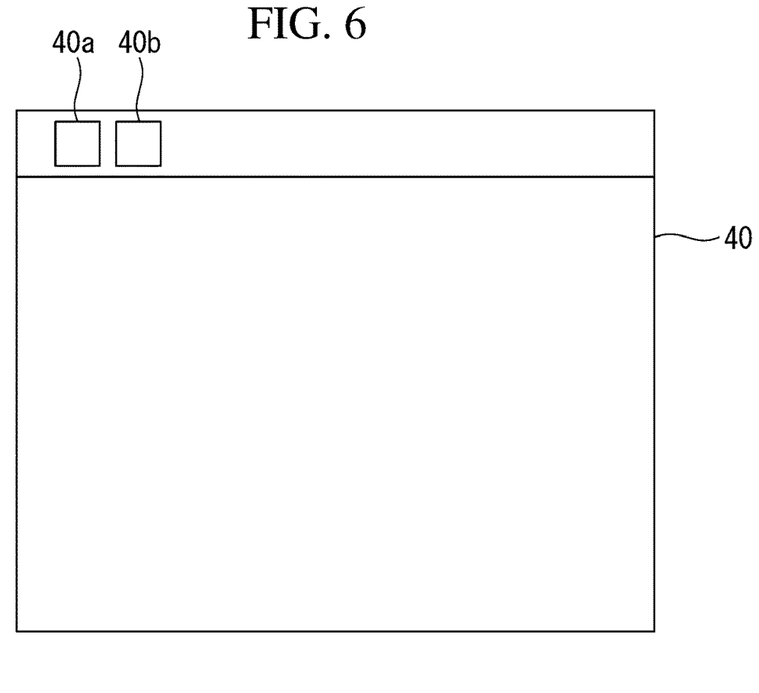
FIG. 6 is a diagram showing an example of an adjustment screen of the article transfer device according to the second embodiment.

The control unit 21 operates according to the interference area adjustment program 24i and causes an adjustment screen 40 as shown in FIG. 6 to be displayed on the display device 22. A model image setting button 40a and an interference area adjustment button 40b are displayed on the adjustment screen 40.

Figure 7:
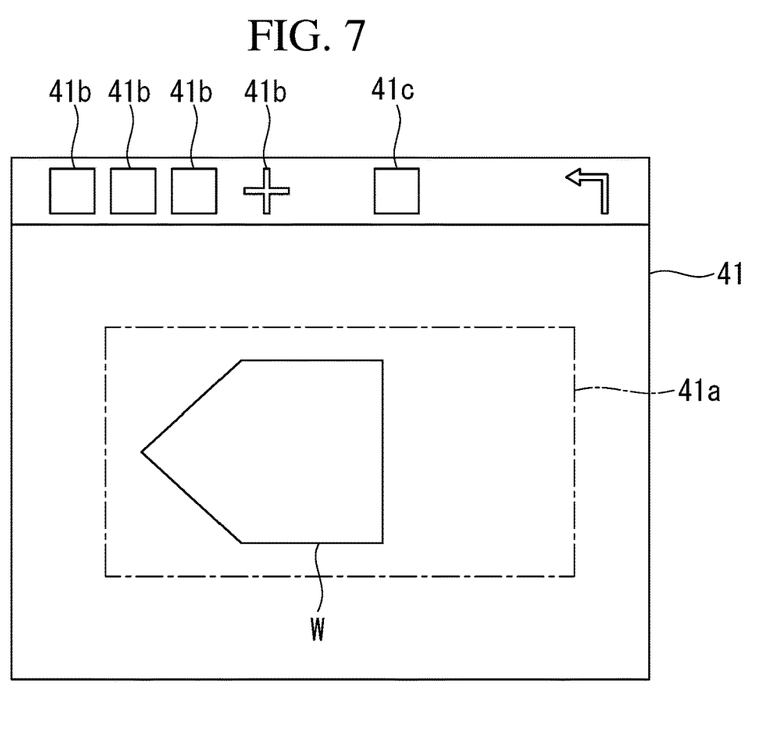
FIG. 7 is a diagram showing an example of a model image setting screen of the article transfer device according to the second embodiment.

When the model image setting button 40a is pressed, transition to a model image setting screen 41 shown in FIG. 7 takes place, and an image of a workpiece W is displayed on the screen. Additionally, as the image, design data such as CAD data may be used, and a contour image of a workpiece W extracted by applying image processing to an image captured by the image capturing device 30 may also be used.

Furthermore, a model determination frame 41a is displayed on the model image setting screen 41, and buttons 41b for changing shape, size, position and the like of the model determination frame 41a, an enter button 41c, and the like are displayed in a menu bar. An operator operates the buttons 41b, 41c by using the input device 23, and defines the shape, size, position and the like of the model determination frame 41a.

Figure 8:
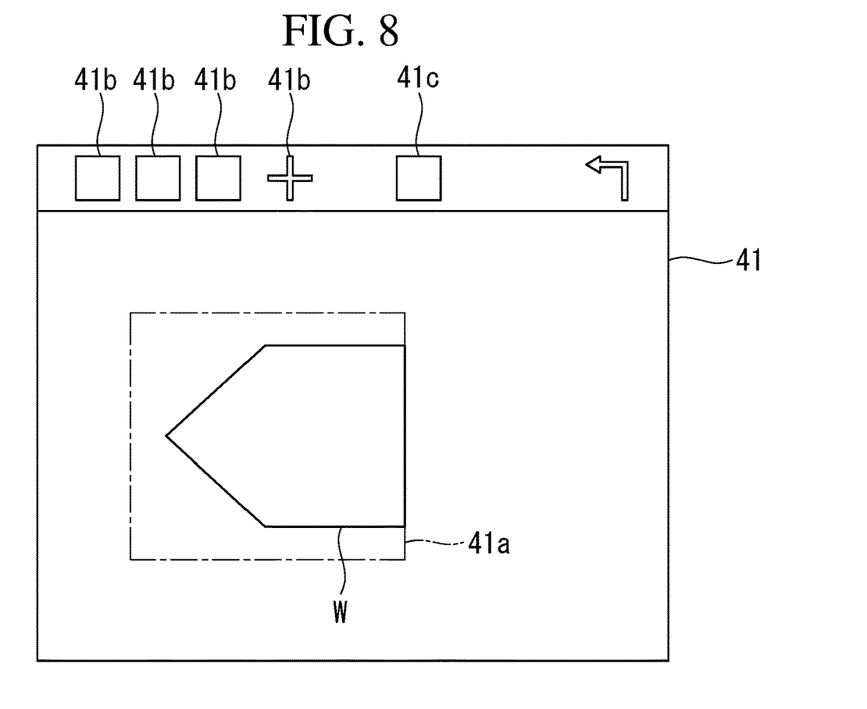
FIG. 8 is a diagram showing an example of the model image setting screen of the article transfer device according to the second embodiment.

For example, when the model determination frame 41a is defined with the shape, size, and position shown in FIG. 8, a shape shown by a solid line in the model determination frame 41a in FIG. 8 is made the model image. The determined model image is stored in the storage device 24 as the model image described in the first embodiment and is also stored in the storage device 24 as a set range for the interference area IA described in the first embodiment.

Figure 9:
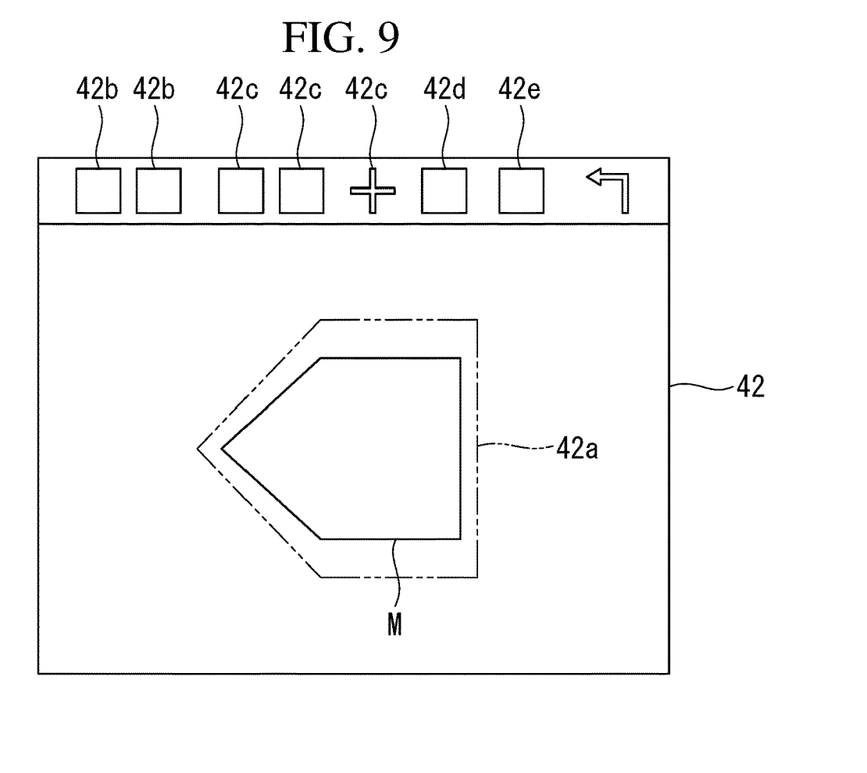
FIG. 9 is a diagram showing an example of an interference area adjustment screen of the article transfer device according to the second embodiment.

Next, when the screen returns to the adjustment screen 40, and the interference area adjustment button 40b is pressed, transition to an interference area adjustment screen 42 shown in FIG. 9 takes place, a model image M which is set and an interference area frame 42a are displayed on the screen. Moreover, buttons 42b for changing a shape of the interference area frame 42a, buttons 42c for changing size and position of the interference area frame 42a, a button 42d for rotating the model image M and the interference area frame 42a, an enter button 42e, and the like are displayed in a menu bar. An operator operates the buttons 42b-42e by using the input device 23, and defines the shape, size, position and the like of the interference area frame 42a.

The operator may set the shape, position, and size of the interference area frame 42a according to the type of the workpiece W, based on the operator's experience or the like. For example, normally, a substantially rectangular interference area frame 42a seems suitable for a substantially rectangular workpiece W; however, depending on the type of the workpiece W, the transferring speed or the like, an oval interference area frame 42a is possibly appropriate. The operator is allowed to select the shape of the interference area frame 42a according to the type of the workpiece W, the number of the workpieces W, and the like.

Furthermore, if, depending on the type of the workpiece W, the transferring speed or the like, the pickup efficiency is increased if a space between an end portion of the model M in a longitudinal direction and the interference area frame 42a is reduced, the operator may set the interference area frame 42a as such. Moreover, in the case where the interference area frame 42a is desired to be set at each arrangement angle of the model M, the interference area frame 42a is defined at each arrangement angle while the model M is being rotated by the button 42d.

The interference area frame 42a defined in the above manner is stored in the storage device 24 as the interference area IA described in the first embodiment, and as described in the first embodiment, the interference area IA is set for each detected workpiece W based on the position and angle in the workpiece information of each detected workpiece W.

Additionally, a setting button for automatically widening the interference area IA in the transferring direction of the detected workpiece W by the conveyor 100, or for automatically narrowing the interference area IA in a direction orthogonal to the transferring direction may be provided on the interference area adjustment screen 42.

The second embodiment enables an operator, who operates the article transfer device to perform the workpiece picking operation, to adjust the interference area IA based on the operator's experience or the like, in addition to achieving the advantageous effects of the first embodiment. An operator is a person who actually operates the article transfer device, and in many cases, the operator is familiar with characteristics of the robot 10 or characteristics of the workpiece W to be picked up by the robot 10. Accordingly, by enabling the operator to set the interference area IA based on the operator's experience, a more efficient picking operation may be realized for the workpiece W.

From the above-described embodiments, the following aspects of the present disclosure are derived.

An article transfer device according to an aspect of the present disclosure includes at least one robot configured to perform a workpiece picking operation with respect to a conveyor for transferring a plurality of workpieces; an image capturing device configured to sequentially capture images of the workpieces on the conveyor; a workpiece identification means configured to perform workpiece detection in the images captured by the image capturing device; a workpiece information storage device configured to store workpiece information about a position and an angle of each detected workpiece, when the workpiece detection is performed by the workpiece identification means; an identical workpiece determination means configured to compare the workpiece information of each of the detected workpieces in a newly captured image, to which the workpiece detection is performed, with the workpiece information of each of the detected workpieces in at least one of previously captured images, to which the workpiece detection is performed, to determine whether one or more of the detected workpieces that are identical to the detected workpieces in the at least one previously captured images exist in the newly captured image; a workpiece information selection means configured to perform selection with respect to at least one detected workpiece determined as an identical one by the identical workpiece determination means, in order to store in the workpiece information storage device only one of the workpiece information regarding the newly captured image and the workpiece information regarding the at least one of the previously captured images, the workpiece information to be stored being closer to predetermined reference information; an interference area setting means configured to set an interference area for each of the detected workpieces in each of the images; and an interference determination means configured to determine whether or not the interference area of the each detected workpiece interferes with a contour of another detected workpiece, wherein the robot does not perform the workpiece picking operation for detected workpieces to which interference is determined by the interference determination means.

According to this aspect, with respect to a detected workpiece which is present in a new image and at least one previous image, the workpiece information for the new image and the workpiece information for the previous image are compared with each other, and for example, in the case where a model image for the workpiece is used as the predetermined reference information, the workpiece information with a higher similarity to the model image is saved in the workpiece information storage device. In the case where the shape of the workpiece itself is not greatly varied, this means that the more similar to the model image, the closer the shape of the detected workpiece is to the actual shape. Accordingly, the workpiece information of the detected workpiece which is closer to the actual shape of the workpiece is saved in the workpiece information storage device.

Because the robot performs the picking operation by using the position, angle or the like of the detected workpiece obtained from the workpiece information, if the workpiece information of the detected workpiece which is closer to the actual shape of the workpiece is kept in the workpiece information storage device, position recognition and angle recognition can be more accurately performed for the workpiece.

Furthermore, because the interference area is set for such an accurate detected workpiece, the interference area is more appropriately set, and this is advantageous in increasing the accuracy and efficiency of the picking operation of the workpiece.

In the aspect described above, the interference area setting means is preferably configured to set the interference area according to a workpiece type. According to such a configuration, a more appropriate range is set as the interference area according to the workpiece type, and this is even more advantageous in increasing the accuracy and efficiency of the picking operation of the workpiece.

In the aspect described above, the image capturing device is preferably configured to capture an image of the workpiece every time the conveyor moves a predetermined distance. According to such a configuration, an overlapping range of a new image and a previous image may be easily and reliably set. For example, in the case where a range where the shape of the workpiece is relatively accurately captured by the image capturing device is known, a state where all the workpieces are inevitably entirely captured in the range where the shapes of the workpieces are relatively accurately captured may be realized by setting the predetermined distance.

In the aspect described above, the article transfer device is preferably provided with an input device configured to receive an input from an operator who operates the article transfer device to perform the workpiece picking operation, and an interference area adjustment means configured to adjust, based on the input to the input device, at least one of a shape or a size of the interference area set by the interference area setting means.

According to such a configuration, an operator operating the article transfer device to perform the workpiece picking operation may adjust the interference area based on the operator's experience or the like. An operator is a person who actually operates the article transfer device, and in many cases, the operator is familiar with characteristics of the robot or characteristics of the workpiece to be picked up by the robot. Accordingly, by enabling the operator to set the interference area based on the operator's experience, a more efficient picking operation may be realized for the workpiece.

In the aspect described above, preferably, the interference area adjustment means causes a display device to display an image of the workpiece and a model determination frame, and determines a part of the image of the workpiece, which is arranged in the model determination frame, as an interference area setting portion of the workpiece, wherein a position and a size of the model determination frame is adjusted based on an input to the input device, and the interference area setting means is configured to set, in each of the images, the interference area to the interference area setting portion of the each detected workpiece.

According to such a configuration, an operator may set a part of the workpiece as the interference area setting portion, instead of the entire workpiece, based on the operator's experience or the like. Depending on the type of the workpiece, a problem is less likely to occur in the workpiece picking operation by the robot if a part of the workpiece is made the interference area setting portion, instead of the entire workpiece, and because an operator may freely perform setting based on the operator's experience, operation efficiency may be increased.

According to the aforementioned aspects, position recognition and angle recognition for a workpiece can be more accurately performed, while performing proximity state determination of the workpiece.

REFERENCE SIGNS LIST 10 robot
11 servo motor
12 workpiece holding device
20 control device
21 control unit
22 display device
23 input device
24 storage device (workpiece information storage device)
24a system program
24b operation program
24c workpiece detection program (workpiece identification means)
24d storage program
24e identical workpiece determination program (identical workpiece determination means)
24f workpiece information selection program (workpiece information selection means)
24g interference area setting program (interference area setting means)
24h interference determination program (interference determination means)
24i interference area adjustment program (interference area adjustment means)
25 servo controller
26 teach pendant
30 image capturing device
40 adjustment screen
41 model image setting screen
41a model determination frame
42 interference area adjustment screen
42a interference area frame
100 conveyor
W workpiece
IA interference area
M model image

The invention claimed is:

1. An article transfer device comprising:
at least one robot configured to perform a workpiece picking operation with respect to a conveyor for transferring a plurality of workpieces;
a camera configured to sequentially capture images of the workpieces on the conveyor; and
a computer comprising a processor, wherein the computer is configured to execute:
a workpiece identification process which performs workpiece detection in the images captured by the camera;
a workpiece information storage process which stores workpiece information about a position and an angle of each detected workpiece in a storage device, when the workpiece detection is performed in the workpiece identification process;
an identical workpiece determination process which compares the workpiece information of each of the detected workpieces in a newly captured image, to which the workpiece detection is performed, with the workpiece information of each of the detected workpieces in a previously captured image, to which the workpiece detection is performed, to determine whether one or more of the detected workpieces that are identical to the detected workpieces in the previously captured image exist in the newly captured image;
a determination process which performs, for at least one detected workpiece determined as an identical one in the identical workpiece determination process, a first determination that determines a degree of match between the workpiece information in the newly captured image and a predetermined model, and a second determination that determines a degree of match between the workpiece information in the previously captured image and the predetermined model;
a workpiece information selection process which performs selection to store in the storage device only one of the workpiece information of the newly captured image and the workpiece information of the previously captured image, wherein the degree of match of the workpiece information which is to be stored is higher than the degree of match of the workpiece information which is not to be stored;
wherein the computer is further configured to execute:
an interference area setting process which sets an interference area for each of the detected workpieces in each of the images; and
an interference determination process which determines whether or not the interference area of the each detected workpiece interferes with a contour of another detected workpiece; and
wherein the robot does not perform the workpiece picking operation for detected workpieces to which interference is determined by the interference determination process.

2. The article transfer device according to claim 1, wherein the computer is configured to set, in the interference area setting process, the interference area according to a workpiece type.

3. The article transfer device according to claim 1, wherein the camera is configured to capture an image of the workpiece every time the conveyor moves a predetermined distance.

4. The article transfer device according to claim 1, further comprising:
an input device which comprises a button which is configured to receive an input from an operator who operates the article transfer device to perform the workpiece picking operation; wherein
the computer is configured to execute an interference area adjustment process which adjusts, based on the input to the input device, at least one of a shape or a size of the interference area set in the interference area setting process.

5. The article transfer device according to claim 4, wherein:
the computer is configured to display an image of the workpiece and a model determination frame in a display device in the interference area adjustment process, and determine a part of the image of the workpiece, which is arranged in the model determination frame, as an interference area setting portion of the workpiece, wherein a position and a size of the model determination frame is adjusted based on an input to the input device; and
the computer is configured to set, in the interference area setting process, the interference area to the interference area setting portion of the each detected workpiece in each of the images.

* * * * *